Feb. 4, 1964     C. E. HILGERS     3,120,599
OPEN WARMER

Filed Aug. 27, 1962     2 Sheets-Sheet 1

INVENTOR.
CLAIR E. HILGERS
BY
Kimmel & Crowell
ATTORNEYS

Feb. 4, 1964   C. E. HILGERS   3,120,599
OPEN WARMER
Filed Aug. 27, 1962   2 Sheets-Sheet 2

INVENTOR.
CLAIR E. HILGERS
BY
Kimmel & Crowell
ATTORNEYS

United States Patent Office 3,120,599
Patented Feb. 4, 1964

3,120,599
OPEN WARMER
Clair E. Hilgers, 201 International Road, Garland, Tex.
Filed Aug. 27, 1962, Ser. No. 219,572
5 Claims. (Cl. 219—34)

This invention relates to an open warmer and has as its primary object the provision of a display rack for heated foods wherein the foods are heated from both top and bottom by convective heat currents in such manner that a legal or desired temperature is maintained uniformly throughout the food product constantly, and whereby the products may be removed as desired without the necessity of opening and/or closing any doors, covers, lids, or the like.

An additional important object of this invention is the provision of a device of this character which will maintain food products such as barbecued chickens, roast meats, pies, or the like, at a continuous and even temperature so that they may be sold as hot products, and removed from the warmer while still in a continuous, even, relatively high temperature throughout.

A still further object of the invention is the provision of a device of this character whereby the temperature may be thermostatically controlled, and wherein the greatest heat is concentrated toward the center of the unit so that an undue amount of heat will not be disseminated into the surrounding store creating an unpleasant or difficult heat situation in the locality of the warmer.

A further object of the invention is the provision of a device of this character which includes an anodized aluminum plate to which are secured resistance elements for heating, and which is surmounted by a spaced grill, the arrangement being such that regardless of the temperature of the plate the hand may be placed on the grill without burning, but that, conversely, a piece of meat or other food placed on the grill will in a short time become uniformly heated throughout its entirety to the desired temperature.

A still further object of the invention is the provision of a device of this character which enables a store owner to barbecue or roast his product, bake a pie, or the like, package the products and place them on the unit in the same manner as any other food in the store so that the heated articles of food may be removed by the customer with no opening of doors, wherein all the food thereon is maintained at the same even temperature and is plainly visible obviating the necessity for feeling around for certain articles.

Still another object of the invention is the provision of a device of this character which by means of the provision of heating units on both top and bottom, and by the use of convective heat, permits more than one layer of food to be positioned on the grid and all maintained at a constant and even temperature.

Still another object of the invention is the provision of a glass wall or fence around the lower plate, one purpose of which is to provide for better and more compact and accurate loading of the plate or grid, and another purpose of which is the preclusion of circulating air currents which will tend to affect the temperature of the heating unit per se.

A still further object of the invention is the provision of a device of this character which may be employed to contain packaged foods which, when positioned in an aluminum pan, and wrapped in cellophane, may be picked up and handled comfortably by the customer even though the temperature of the food contained therein may be in the neighborhood of the legal 150°, which is the temperature customarily required in most localities.

A still further object of the invention is the provision of a device of this character which is sturdy and durable in construction, reliable and efficient in operation, and relatively simple and inexpensive to manufacture, assemble, and utilize.

Still other objects will in part be obvious, and in part be pointed out as the description of the invention proceeds and shown in the accompanying drawings wherein there is disclosed a preferred embodiment of this inventive concept.

In the drawings.

Similar reference characters refer to similar parts throughout the several views of the drawing.

Figure 1:
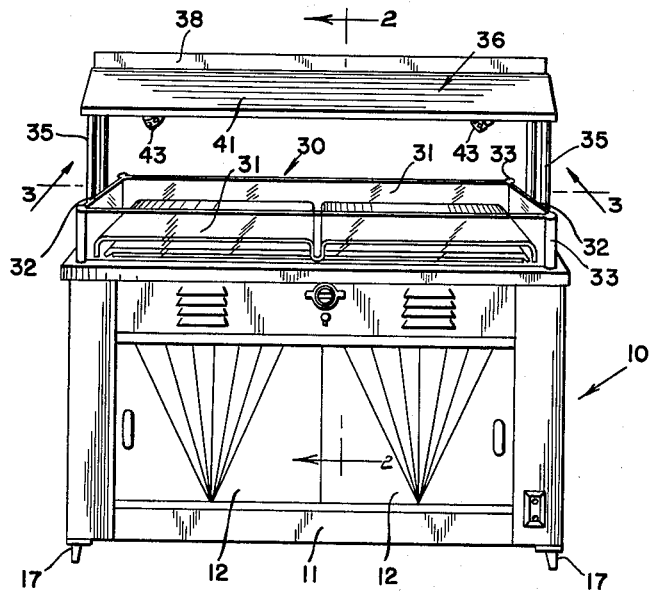
FIGURE 1 is a perspective view of one form of open warmer embodying the instant inventive concept.

Having reference now to the drawings in detail, the device of the instant invention is generally indicated at 10 and comprises a base or cabinet structure which includes a front wall 11 which is provided with doors 12, and a rear wall 13. End walls 14, a bottom wall 15 and a top plate or wall 16 complete the cabinet structure, which is supported on legs 17. The cabinet may serve as a storage space to condition or preserve the stored food under conditions differing from ambient conditions as more fully described hereinafter. The top wall 16 is provided with a subwall 18 and has an elongated relatively wide central opening 19 formed therein, in which is positioned an anodized aluminum tray or pan 20. Pan 20 has an outstanding peripheral flange 21, and is filled with fiber glass or similar insulating material 22. While the cabinet or support may be of any desired size it has been found desirable to make the opening 19 of a size sufficient to accommodate a 24" x 48" plate.

Figure 5:
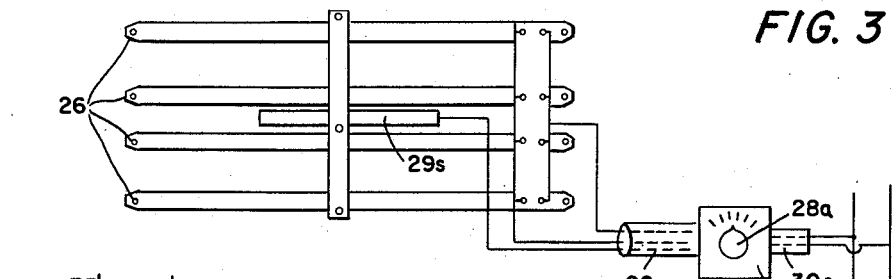
FIGURE 5 shows diagrammatically a typical heater control for the radiant units 26.

Supported directly above the fiberglass insulation 22 by means of ceramic or other suitable heat insulating blocks 23 is an anodized aluminum plate or panel 24, the plate being wholly supported on blocks 23 which in turn rest on flange 21. Panel 24 has an inclined perimetric flange 25 and has firmly affixed to its underside a plurality, illustratively four, of resistance heating elements 26. In the illustrative embodiment of the invention shown each of these units is approximately of 500 watt capacity, and two of them are relatively closely placed adjacent the longitudinal center of the plate, while the other two are placed closer to the edge. By virtue of this arrangement more heat is generated at the center of the panel, thus minimizing the dissemination of heat outwardly from the plate to the store where the warmer is situated. Current is supplied to the units 26 in any desired manner, and the temperature thereof is controlled by a thermostat 27a having the usual manual control 28a. The temperature sensor is indicated by 29s in FIGURES 3 and 4. The thermostat may be either adapted to control all the elements, with the outer elements set at a slightly lower temperature (see FIG. 5), or, alternatively, if desired, an individual thermostat (not shown) may be provided for each element.

Situated about one inch above anodized aluminum panel 24 is a grill or grid 27 which is supported by legs 28, and upon which is adapted to be positioned packaged food 29, such as roast meat, barbecued chickens, pies, cakes, or other similar articles which it is desired to maintain at a constant temperature.

A glass fence or wall approximately six inches high is generally indicated at 30, and comprises long side strips 31 and shorter end strips 32 which are affixed in corner posts 33 in any desired conventional manner. This fence permits a larger and more compact food load on the grid, and also shields the grid from the air currents in the store, or whatever place the unit is in. The useless dissemination of radiant heat directly from the panel 24 is therefore reduced by the larger load, and the convection heat loss to the ambient atmosphere surrounding the unit is also reduced.

Figure 2:
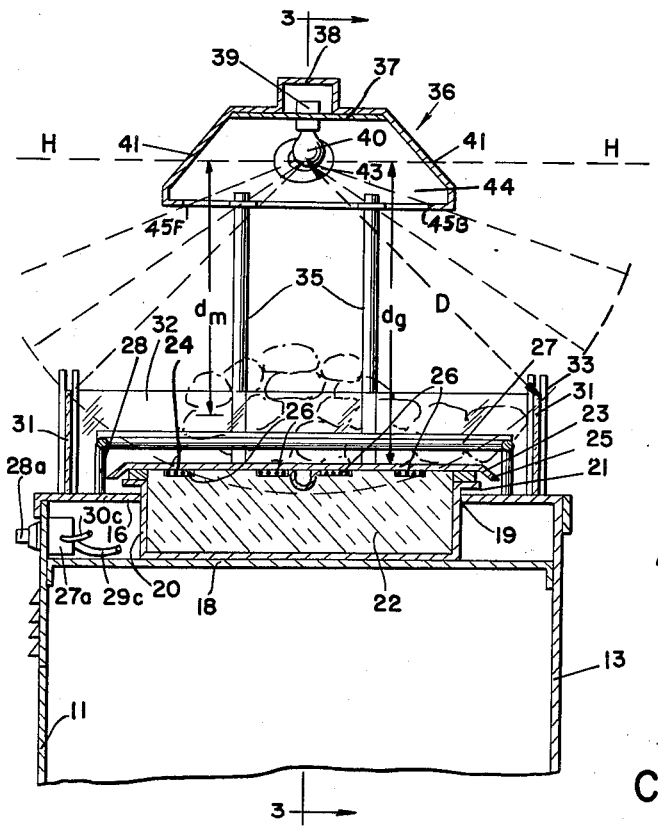
FIGURE 2 is an enlarged elevational sectional view taken substantially along the line 2—2 of FIGURE 1 as viewed in the direction indicated by the arrows.
Figure 3:
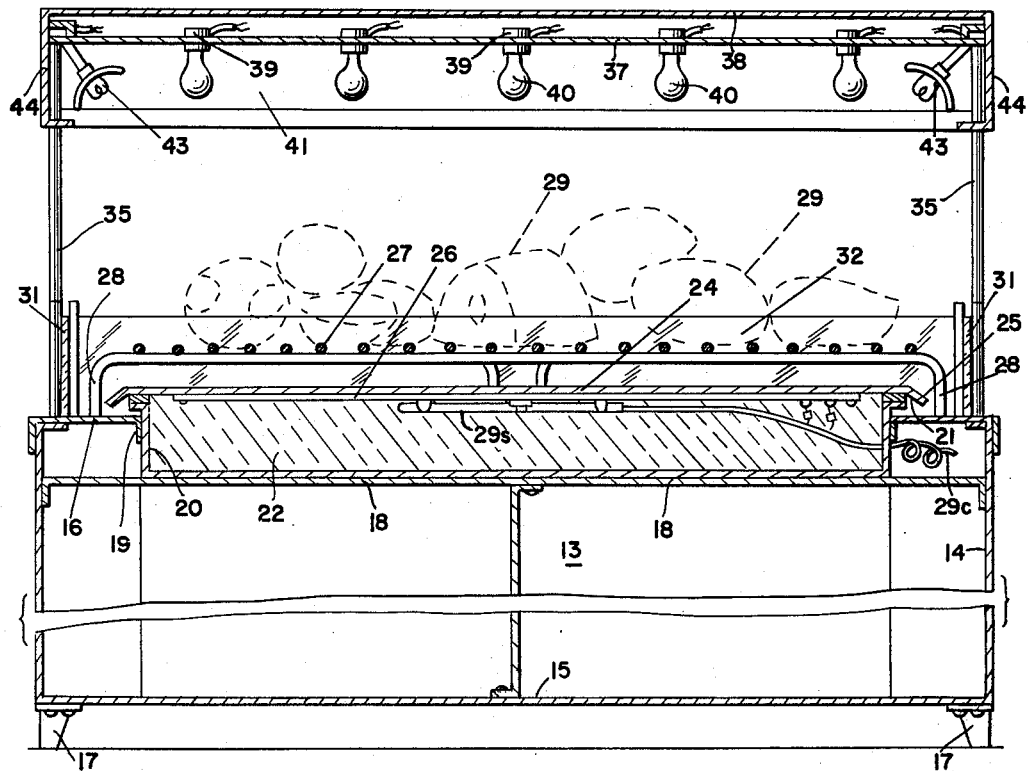
FIGURE 3 is an enlarged elevational sectional view partly broken away taken substantially along the line 3—3 of FIGURES 1 and 2 as viewed in the direction indicated by the arrows.

At each end of cabinet or base structure 10 a pair of uprights 35 extend vertically upwardly and support a hood generally indicated at 36. As best shown in FIGURES 2 and 3, hood 36 comprises a top plate 37 having a central raised channel 38 extending thereabove, into which extend a plurality of light sockets 39 which carry light bulbs 40. The bulbs 40 in addition to illuminating the meats or other produce 29 also serve as auxiliary heating units. Thus radiant heat is generated by bulbs 40. Direct rays from the bulbs pass downwardly towards the grill in a zone inclined between planes whose traces are depicted by a front line passing from the center of 40 (FIG. 2) through point 45F and a back line through the center of 40 and passing through 45B. Points 45F and 45B are the bottom parts of the horizontal bottom lips at the base of hood 44.

Rays from 40 are also reflected downward by single-reflection from top plate 37 and from inclined sides 41. The reflection from 37 covers zones from almost below 40 to slightly over the tops of the glass fences 30, the front half of 37 (the left in FIG. 2) reflecting towards the front portion of the grid and the back half of 37 (the right in FIG. 2) reflecting towards the back portion of the grid.

The inclined sides 41 of the hood also singly-reflect from source 40, but the front inclined side reflects towards the back of the grid, and the back inclined side reflects towards the front of the grid. Each reflection from an inclined side extends from approximately below 40 to about the midheight of the front and back glass fences.

Also there are double-reflections from 40 to top 37, then to sides 41 and then downwardly to adjacent the left and right front and back portions (FIG. 2) of the grid, the double-reflection from the front of the hood passing to the front of the grid, and the double reflection from the back of the hood passing to the back of the grid.

Adding all these reflections on grid 27 from source 40 by the hood 36, it is noted that the reflections vectorially add or build up in magnitude from adjacent the tops of the fences towards the center of the unit, namely below the source 40. The fact that the height $d_g$ of FIG. 2 is less than D further accentuates this center magnitude of reflection by a further ratio of approximately $D^2/d_g^2$ or about 1.6 (the inverse square law of light measurement).

Using the proportions of FIG. 2 merely as an example, but not as a limitation of the disclosure, it is found that the above-mentioned front and back tracer lines are about 20° below a horizontal line H—H thus giving a zone of 140° of direct rays from source 40 as measured on a circular reference base of radius D (see FIG. 2). Proceeding downward on this circular base by about 15° (or 35° below H—H) the single reflections from the top 37 start to firstly reinforce the direct ray. Continuing downward on the circular base (towards 90°, which is immediately below source 40) it is found that at 45° from H—H the above first reinforcement exists.

Continuing downward beyond 45° on each side (front and back) restricts us to the midzone within or between the glass fences and over the zone of the grid. In this midzone the various reflections from the hood sides and the double reflections from both the top plate and inclined sides provide second and third reinforcements to the direct ray and thus the total effect of source 40 is greater within or between the fences than outside the same.

Now as the grill top forms a chord of the circular reference base, and as the maximum thickness of this chord arc segment is below the source 40, it is noted that the inverse square law above mentioned will give a maximum effective ray midway between front and back.

The distance from the center of 40 and the center of gravity of any pile of food material on the grid is $d_m$ of FIG. 2, and $d_m$ is less than $d_g$, thus the difference between $d_g$ and $d_p$ increases this center ray maximum a further amount.

In addition to the bulbs 40, heat is provided in the hood by means of a pair of resistance heating elements 43 which are positioned adjacent each vertical end wall 44 of the hood (FIG. 3) and are inclined inwardly from the vertical wall 44, and also downwardly from the top plate 37, to direct heat downwardly to the food 29 positioned on the grid 27. The above discussed center cumulative maximum effect takes place with each resistance heating element 43.

Thus a maximum amount of heat is radiated to the food, both from the grid below and from the hood above, at its mid portion, and lesser amounts of heat are radiated to the front and back portions.

This purposely uneven heat distribution is unique with the applicant, as far as is known, and it is believed that it is a major factor in the successful commercial performance of the unit, and the approval of the machine at the state food inspections.

Figure 4:
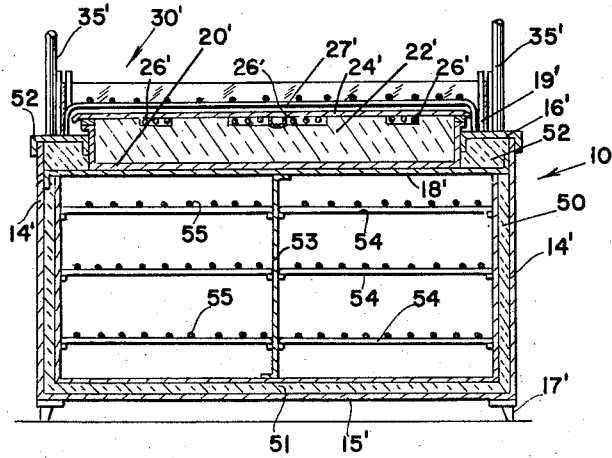
FIGURE 4 is a reduced longitudinal elevational sectional view showing a modified form of construction wherein an insulated storage cabinet may be provided if desired to condition or preserve the stored food under conditions differing from ambient conditions.

FIGURE 4 discloses a slightly modified form of apparatus wherein the panel 27', the insulation 22', the heating elements 26', and the hood (not shown) are all identical with the previously disclosed apparatus of FIGS. 1–3, but the lower base or support is provided adjacent all of its walls with insulation 50, including an insulated bottom 51, and an insulated portion 52 around aluminum pan 20. In this modification the interior is provided with a central partition 53 and a plurality of shelves 54. The shelves 54 may be provided with conventional units (diagrammatically represented by 55) to maintain the stored food at temperatures or humidities different from the ambient conditions. These conventional units may be constructed and arranged to effect humidity or temperature changes in the stored material, and more especially, heating and refrigerating of the food. Any such use of this portion of the structure occasions no alteration in the anodized aluminum heating plate 24', which it is to be pointed out, is preferably approximately ⅛" thick for best results; the four heating elements 26 of 500 watts each located beneath the plate and secured directly thereto; the upper hood 41, or the heating elements in the hood.

From the foregoing it will now be seen that there is herein provided an open radiant-type warmer, which accomplishes all of the objects of this invention, and others, including many advantages of great practical utility and commercial importance.

As many embodiments may be made of this inventive concept, and as many modifications may be made in the embodiments hereinbefore shown and described, it is to be understood that all matter herein is to be interpreted merely as illustrative, and not in a limiting sense.

I claim:

1. In an open warmer for food products, the combination of,
   (1) a cabinet base including an oblong and horizontal top wall having a similarly shaped central opening,
   (2) a horizontal sub-wall vertically spaced below the top wall sealing the upper and lower parts of the cabinet from each other, (3) a horizontally flanged metal pan fiting snugly within the opening and resting upon the sub-wall, the height of the pan to th eflange being such as to leave a small gap between the flange and the top wall, (4) a horizontal aluminum plate spaced above the pan flanges and extending slightly therebeyond in both length and width directions, the plate possessing a heat resistive electrical insulating surface coating at least on its underside, (5) a plurality of pairs of exteriorly rod-shaped electrical resistive metallic heating elemetns longitudinally secured tightly to the underside of said plate, each element electrically connected to a controllable electrical power source, (6) the centrally positioned heating pair of elements producing greater amounts of heat than the elements nearer the longitudinal edges of the plate, (7) the volume between the plate with the secured heating elements and the pan being heavily and thoroughly heat-insulated with insulation possessing a solidity sufficient to vertically fixedly support the horizontal pan above the flanges.

2. The structure of claim 1 wherein, (1) a flat faced grid with vertical legs rests on the top wall, (2) the face of the grid spaced above the plate and the legs of the grid spaced horizontally beyond the plate, (3) the face of the grid receiving food products which are in radiative and convective relationship only with respect to the plate.

3. The structure of claim 2 wherein, (1) a glass fence is secured to the top wall surrounding and spaced from the plate and the legs of the grid, and of a height about twice that of the grid, to pile food products thereagainst and to at least partly shield the grid and the food products from ambient air currents surrounding the warmer.

4. The structure of claim 3 wherein, (1) an overhead hood with a flat top and downwardly sloping sides is supported from each end of the base, (2) the hood extending transversely only over a mid-portion of the width of the base, and extending longitudinally the full length of the base, (3) a plurality of electrical bulbs located on the longitudinal axis of the hood and oriented downwardly, (4) and at least one resistance heating element near each end of the hood and directed inwardly and downwardly, (5) to thus concentrate from above both light and heat along the longitudinal central portion of the plate, and to direct lesser amounts of light and heat along the longitudinal edge portions of the plate.

5. The structure of claim 1 wherein, (1) the surface coating of the aluminum plate is of anodic type, (2) and the thickness of the aluminum plate is approximately one-eighth of an inch.

References Cited in the file of this patent

UNITED STATES PATENTS

| | | |
|---|---|---|
| 1,533,175 | Fahrenwald | Apr. 14, 1925 |
| 1,982,073 | Sawin | Nov. 27, 1934 |
| 2,232,156 | Abeles | Feb. 18, 1941 |
| 2,277,282 | Walborn | Mar. 24, 1942 |
| 2,483,664 | Osterheld | Oct. 4, 1949 |
| 2,678,991 | Amfitheatrof | May 18, 1954 |
| 2,681,404 | Hofer | June 15, 1954 |
| 2,863,979 | Fitzgerald | Dec. 9, 1958 |
| 2,906,850 | Meletio et al. | Sept. 29, 1959 |